July 22, 1941.                H. W. HOW                2,249,831
RING GEAR MOUNTING FOR ROTARY DRIERS, KILNS, AND SIMILAR EQUIPMENT
                    Filed April 1, 1939            2 Sheets-Sheet 1
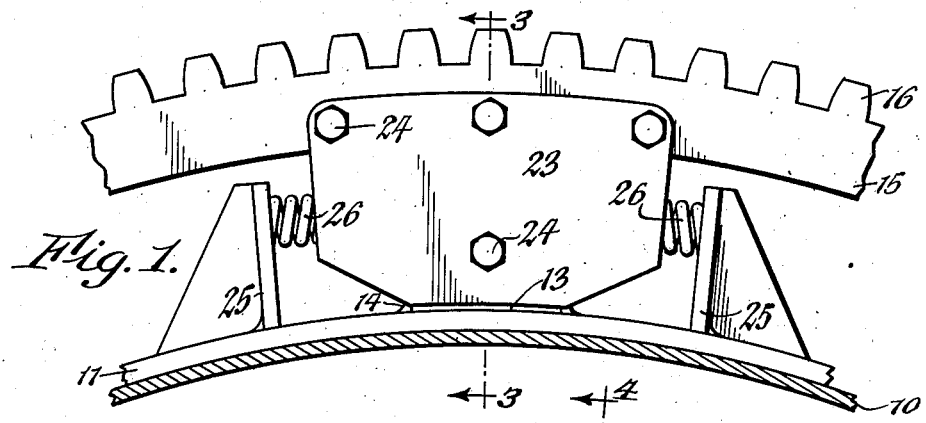
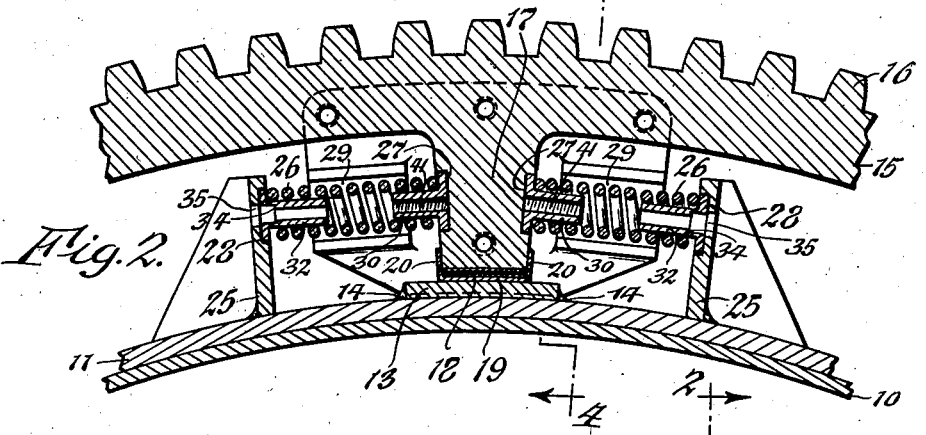
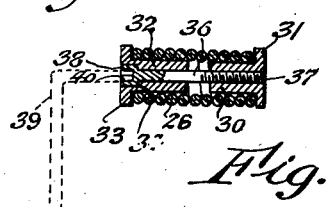
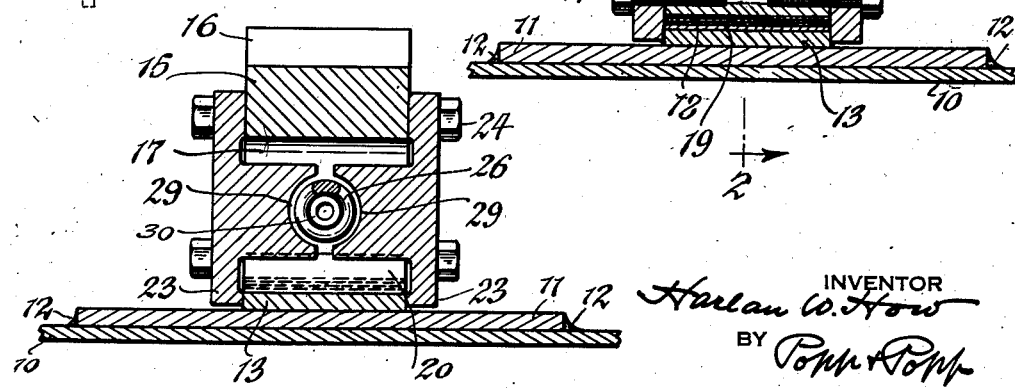
INVENTOR
Harlan W. How
BY Popp & Popp
ATTORNEYS July 22, 1941.                H. W. HOW                    2,249,831
RING GEAR MOUNTING FOR ROTARY DRIERS, KILNS, AND SIMILAR EQUIPMENT
Filed April 1, 1939                      2 Sheets-Sheet 2
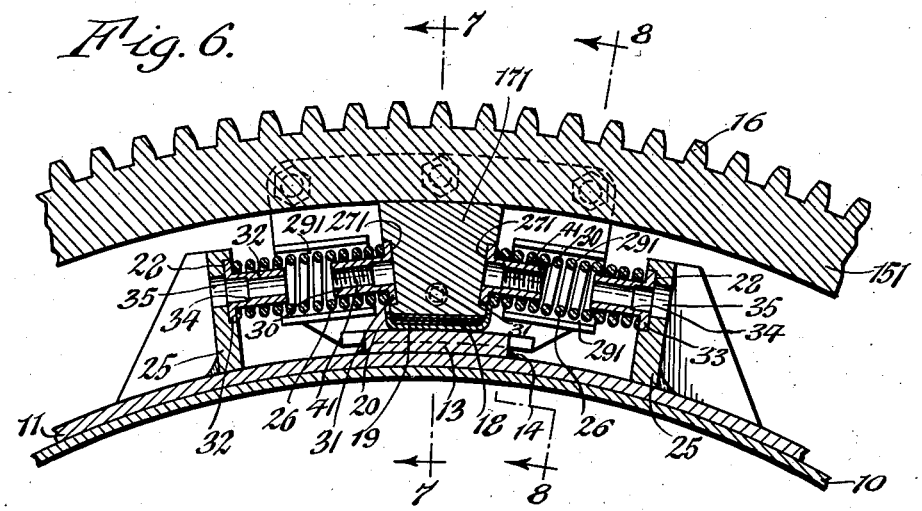
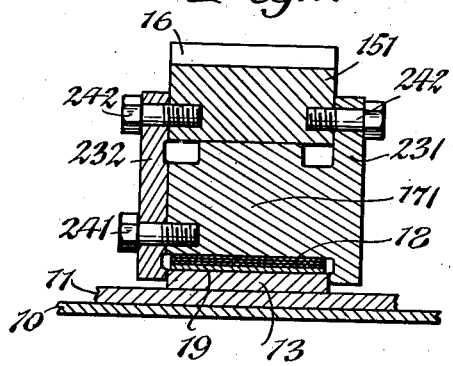 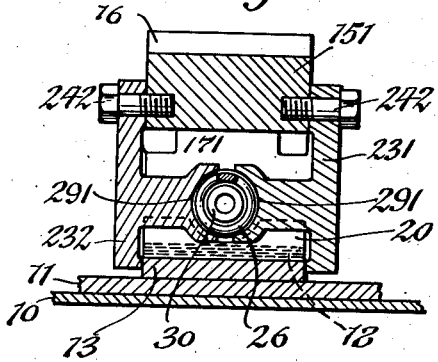
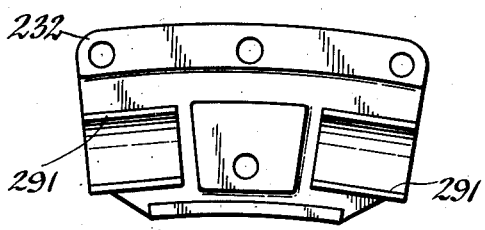 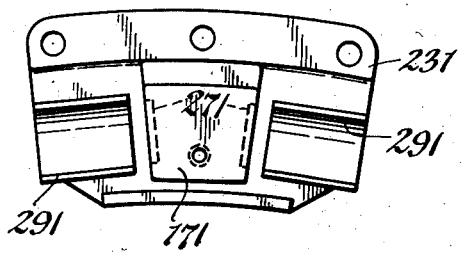
INVENTOR
Harlan W. How
BY Pope & Pope
ATTORNEYS Patented July 22, 1941

2,249,831

UNITED STATES PATENT OFFICE 2,249,831

RING GEAR MOUNTING FOR ROTARY DRIERS, KILNS, AND SIMILAR EQUIPMENT

Harlan W. How, Titusville, Pa., assignor to Struthers Wells-Titusville Corporation, Titusville, Pa., a corporation of Maryland Application April 1, 1939, Serial No. 265,483

2 Claims. (Cl. 64—27)

This invention relates to a means for mounting a driving gear ring on the periphery of a rotary shell or drum such as is used in driers, kilns and similar equipment or apparatus.

It is the object of this invention to provide a driving gear mounting for apparatus of this character which is of durable and efficient construction and whereby the driving ring is capable of yielding and rotating slightly relative to the shell so as to take up shocks incident to starting rotation of the shell from a standstill and also absorb mild shocks which are produced by dropping material within the shell from the lifting shelves or blades during the operation of the machine.

In the accompanying drawings:

Fig. 1 is a fragmentary side view of a gearing and one form of the means for mounting the same on a tubular rotary shell in accordance with this invention.

Fig. 2 is a longitudinal section thereof taken on line 2—2, Fig. 3.

Figs. 3 and 4 are cross sections taken on the correspondingly numbered lines in Figs. 1 and 2.

Fig. 5 is a longitudinal section showing the manner of contracting each of the cushioning springs and holding the same in this position preparatory to inserting this spring into the space between one of the driven lugs or brackets and the driving lug of the gear ring.

Fig. 6 is a vertical longitudinal section, similar to Fig. 2, but showing a modified form of this improvement.

Figs. 7 and 8 are cross sections thereof taken on lines 7—7 and 8—8, respectively.

Figs. 9 and 10 are inside elevations of the two guide plates, respectively, of the modified form of this invention shown in Fig. 6.

In the following description similar characters of reference indicate like parts in the several figures of the drawings:

The numeral 10 represents the tubular shell, drum or body of a rotary drier, kiln or similar apparatus into which the material to be treated may be fed and from which, after treatment, the same may be removed in any suitable and well known manner. Shells of this character are usually supported on the periphery thereof by means of tires applied circumferentially to the exterior of the shell and supported upon rollers which are mounted on a suitable base or foundation so as to facilitate the rotation of the shell. On its interior the shell is usually provided with suitable means for agitating, lifting or otherwise mechanically operating on the material which is fed to the drum so as to facilitate the drying or other operation to which the material is subjected, these internal means of the shell usually including a plurality of lifting shelves or members which pick up the material to be treated while the shelves are in the lower part of the shell and then discharge this material from these shelves while the latter are in the upper part of the shell, thereby producing relatively mild shocks upon the apparatus as this material drops from the lifting shelves to the lower part of the shell.

Due to the large size and weight of these shelves, it requires an extra powerful effort to start the rotation of the same from a standstill, but after the rotation of the shell has begun the continuation of the same can be effected by the use of considerably less power than that required to start it. Yielding power transmitting means are therefore provided which are interposed between the power-driven member of the apparatus and the tubular shell of the same whereby the power-operated member is permitted to move forwardly independently of the shell to a limited extent during the initial or starting operation of the apparatus but rotates with the shell after the same is in motion, thereby absorbing the shock incident to starting of the apparatus as well as absorbing mild shocks when the shell is intermittently subjected to sudden increase in load thereon such as occurs when material under treatment is dropped from the lifting shelves while in the upper part of the shell onto the lower part of the latter. These improved yielding driving means which embody the present invention are constructed as follows:

Referring to Figs. 1–5, the numeral 11 represents a wrapper plate or reenforcing band of annular form which is secured circumferentially to the exterior of the shell in any suitable manner, for example by means of welding, as shown at 12 in Figs. 3 and 4. At intervals on the periphery of this wrapper plate are arranged curved wear plates or shoes 13 which are of suitable length and may be secured to this wrapper plate by welding, as shown at 14 in Fig. 2 or by any other approved means.

The numeral 15 represents a driving ring which extends circumferentially around the shell and to which power from any available source may be applied in various ways for the purpose of rotating this ring. In the present case this is accomplished by providing the periphery of the driving ring with an annular row of gear teeth 16 which is adapted to intermesh with a driving pinion operated by power derived from a prime mover of any suitable character as is now the common practice for rotating a driving or gear ring of this character.

At suitable intervals in its circumference this driving ring is provided on its inner side with a driving abutment or lug 17 which may be either formed integrally on this ring or made separate therefrom and attached thereto by electric welding or otherwise in a well known manner. At its inner end each of these driving lugs is guided on one of the wear or bearing plates 13 so that the driving ring and the shell at times can rotate about their axes independently of each other. For the purpose of accurately fitting each of these driving lugs to the respective wear plate and centering the driving ring relative to the shell so that the apparatus as a whole can be operated with a minimum of power and wear, adjusting means are provided which preferably consist of a plurality of shims 18 supported on the inner end of the respective driving lug and a holder which retains the shims on the driving lug and bears against the outer surfaces of the respective wear plate. The shims preferably consist of one or more thin plates of suitable metal forming a stack which is arranged on the inner end of the driving lug, and the holder is preferably of U-shaped sheet metal and has its cross piece 19 arranged between the innermost shim and the outer bearing surface of the wear plate while the legs 20 of this holder bear against the opposite longitudinal sides of the driving lug and are thereby compelled to move circumferentially with the gear ring, as best shown in Figs. 2 and 4. By interposing a greater or lesser number of shims between the cross piece of each holder and the respective driving lug, it is possible to accurately center the driving ring on the periphery of the shell so that the axes of the driving ring and shell coincide. As the outer surface of the wear plate or shoe and the inner surface of the cross piece of the shim holder become worn any slack between the same can be taken up by inserting the required number of additional shims in the space between each shim holder and the inner side of the companion driving lug.

In order to permit the driving ring and the shell to rotate relatively to one another but hold them against displacement lengthwise of the axis about which they rotate, retaining means are provided which preferably consist of two guide or retaining plates 23 which are arranged on opposite sides of the driving ring and secured thereto by means of bolts 24 so as to rotate therewith while the opposing inner parts of these guide plates engage with opposite circumferential edges of the wear plate or shoe, as shown in Figs. 3 and 4. By these means the driving ring and shell are free to rotate one relatively to the other but movement of one of these parts relative to the other in the direction parallel with the axis about which they rotate is prevented.

For the purpose of yieldingly transmitting the driving motion from the driving ring to the shell when starting the apparatus and also permitting the shell to yield relative to the driving ring during the operation of the apparatus, shock absorbing means are provided which are preferably constructed as follows:

The numeral 25 represents two driven stop or abutment lugs, brackets or shoulders which project radially outward from the reenforcing ring or plate 11 and are arranged on circumferentially opposite sides of the driving lug 17, as shown in Fig. 2. Within the spaces on opposite sides of the driving lug 17 and the two stop lugs or brackets 25 are arranged cushioning members, each of which preferably consists of a helical spring 26 having its axis arranged circumferentially of the shell and driving ring.

These springs are sufficiently strong to maintain the driving lug centrally in the space between the stop lugs and transmit power from the driving ring to the shell for rotating the latter during the normal operation of the apparatus, but when either the driving ring or the shell is subjected to a sudden load such as occurs when first applying power to the driving ring during the starting of the apparatus and also when material is shifted from one part of the interior of the shell to another, then these springs permit the driving ring and shell to move one independently of the other in a direction circumferentially of the axis of these members to a limited extent so as to take up the shock which is produced.

Although various means may be employed for mounting the springs 26 between the driving lug 17 and the driven lugs or brackets 25, each of these springs is mounted as follows:

The numeral 30 represents the tubular neck of an inner collar or sleeve which projects into the inner end of one of the coil springs 26 and is provided at its inner end with an enlarged head or flange 31 which bears against the inner end of this spring and is seated in a recess or socket 27 on the respective side of the driving lug 17. The numeral 32 represents the tubular neck of an outer collar or sleeve which projects into the outer end of one of the springs 26 and is provided at its outer end with an enlarged head or flange 33 which bears against the outer end of this spring and is seated in a recess or socket 28 in the opposing side of the respective driven lug or bracket 25. Each of the inner collars is provided with an internal screw thread 41, each of the outer collars is provided with an outwardly facing internal shoulder 34 and each of the outer brackets or driven lugs 25 is provided with an opening 35 which registers with the bore of the spring collars.

When assembling the spring mounting each spring 26 is first contracted and held in a position in which the same and its collars can be inserted into the space between the driving lug 17 and one of the driven lugs 25 and then this spring is released to permit the inner and outer collars thereof to enter the seats 27 and 28. This contraction is effected by passing a bolt 36 through the outer and inner collars and the spring between them and turning this bolt in the proper direction while engaging its threaded inner end 37 with the thread of the inner collar and engaging the head 38 at its outer end with the shoulder 34 of the outer collar until the distance between the outer extremities of the collars is less than the distance between the inner side of each driven lug 25 and the opposing side of the driving lug 17, as shown in Fig. 5.

After the spring has been thus contracted the same is inserted between one of the driven lugs and the driving lug so that the heads of the collars are in line with the recesses 27, 28 whereupon the bolt 36 is removed from the collars so as to permit the spring to expand and move the heads of the collars into the recesses 27, 28. After the bolt is detached from the collars the same may be removed through the opening 35 in the driven bracket 25. Turning of the bolt for drawing the collars together and contracting the spring and also removing the same from the collars to permit the spring to expand is preferably effected by a wrench 39 which is shown by dotted lines in Fig. 5, in engagement with a socket 40 in the head of the bolt, the engagement of this wrench with the bolt for releasing the latter from the collars being possible by passing the wrench through the opening 35 of the respective driven lug. When dismounting the cushioning springs the same are first contracted by means of the contracting bolt which is passed through the opening 35 and then turned by the wrench for operatively engaging the thread and head of the bolt with the inner and outer collars and drawing the latter together the requisite extent to permit the spring to be removed from between the driving lug 17 and the driven lug 25.

In order to avoid distortion of the shock absorbing or cushioning springs 26, means are provided for holding the central parts of the same against lateral displacement although permitting the same to expand and contract in the direction lengthwise of these springs. These distortion preventing means preferably consist of guide pockets or retaining grooves 29 which are arranged on the inner sides of the guiding and retaining plates 23 and on opposite sides of the central parts of each of the cushioning springs 26. These pockets preferably have the form of channels which are semi-circular in cross section, as shown in Fig. 4, so as to conform to the contour of the adjacent part of the cushioning springs and thereby operate to prevent lateral displacement or distortion of the same but permit each spring to be freely compressed and also expand in a direction lengthwise of its axis.

In the modification of this invention, as shown in Figs. 6, 7, 8, 9 and 10 the shell 10 together with the driven reenforcing band or ring 11, the wearing or bearing plate 13, the driven abutments or lugs which rotate with the shell and the spring cushioning means are constructed substantially like the corresponding parts shown in Figs. 1 to 5 and the operation as hereinbefore described therefore applies to both of these forms of the invention.

Instead of forming the driving abutment or lug integrally with or positively connecting the same with the driving ring, as shown in Figs. 2 and 3, the modified form of this invention, as shown in Figs. 6, 7 and 9, provides a driven abutment 171 which is constructed in the form of a block which is made separate from the driving ring 151 and engages its outer end with the inner side of this ring while the inner end of this driving abutment bears against the guiding surface of the wearing plate 13 through the medium of a U-shaped holder 19, 20 which straddles the inner end of this abutment block and engages with the face of the wearing plate 13 and a plurality of shims 18 interposed between the cross piece 19 of this holder and the inner end of the abutment block. This driving abutment block is formed integrally with one of the guide plates 231 and projects transversely inwardly from the inside of the same, as shown in Fig. 7, and the other companion guide plate 232 is made separate from this driving abutment block and connected therewith by means of a bolt 241. The outer edge portions of the two guide plates 231, 232 are secured by bolts 242 to opposite lateral sides of the driving ring 151, and the inner ends of these guide plates engage slidingly with opposite lateral sides of the wearing plate 13, as shown in Figs. 7 and 8.

On circumferentially opposite sides the driving abutment 171 is provided with recesses 271 in which are seated the flanged opposing ends of the inner opposing collars or sleeves 30, 30 of the two spring cushioning devices which are interposed between opposite sides of the driving abutment 171 and the driven abutments 25 in substantially the same manner in which this is accomplished in the construction shown in Fig. 2.

On their opposing inner sides the two guide plates 231, 232 are provided adjacent to the ends of these plates with longitudinal guide pockets or retaining grooves 291, the grooves on the corresponding parts of these plates together forming a substantially tubular recess or guideway which receives the central part of the adjacent cushioning spring 26 and retains the same in a longitudinal position and thus serves most effectively as a part of the yielding means whereby the power is transmitted from the driving ring 151 to the shell 10 and any shocking action such as has been referred to hereinbefore is avoided.

The construction shown in Figs. 6 to 10 reduces the cost of mounting the shock absorbing means between the driving ring and the shell or drum 10, the same provides an assembly which is easier to put together and take apart and it also lessens the cost of replacement.

These yielding driving and cushioning means are not only very simple, strong and durable in construction, but they can also be produced at low cost and are capable of being readily assembled and dismembered whenever this is necessary or desirable for inspection, adjustment, or repairing of the apparatus of which they form a part.

I claim as my invention:

1. The combination of a cylindrical drum, a driving ring surrounding said drum, and yielding means for transmitting motion from said ring to said drum and guiding the same circumferentially one relative to the other including a wearing plate mounted on the periphery of said drum, a driving lug arranged between said ring and drum and moving with said ring and slidingly engaging said wear plate, driven lugs mounted on said drum on circumferentially opposite sides of said driving lug, springs interposed between opposite sides of said driving lug and the opposing sides of said driven lugs, and guiding and retaining plates turning with said ring and slidingly engaging opposite edges of said wear plate and provided on the inner sides with pockets which receive opposite sides of said springs.

2. The combination of a cylindrical drum, a driving ring surrounding said drum, and yielding means for transmitting motion from said ring to said drum and guiding the same circumferentially one relative to the other including a wearing plate mounted on the periphery of said drum, a driving lug arranged between said ring and drum and moving with said ring and slidingly engaging said wear plate, driven lugs mounted on said drum on circumferentially opposite sides of said driving lug, springs interposed between opposite sides of said driving lug and the opposing sides of said driven lugs, and guiding and retaining plates turning with said ring and slidingly engaging opposite edges of said wear plate and provided on the inner sides with pockets which receive opposite sides of said springs, said driving lug being made separate from said ring, one of said guide plates being formed integrally with one side of said driving lug and detachably connected with the corresponding side of said ring and the other guide plate being made separate from said ring and driving lug and detachably connected with the opposite side of said ring and driving lug.

HARLAN W. HOW.